2,822,640

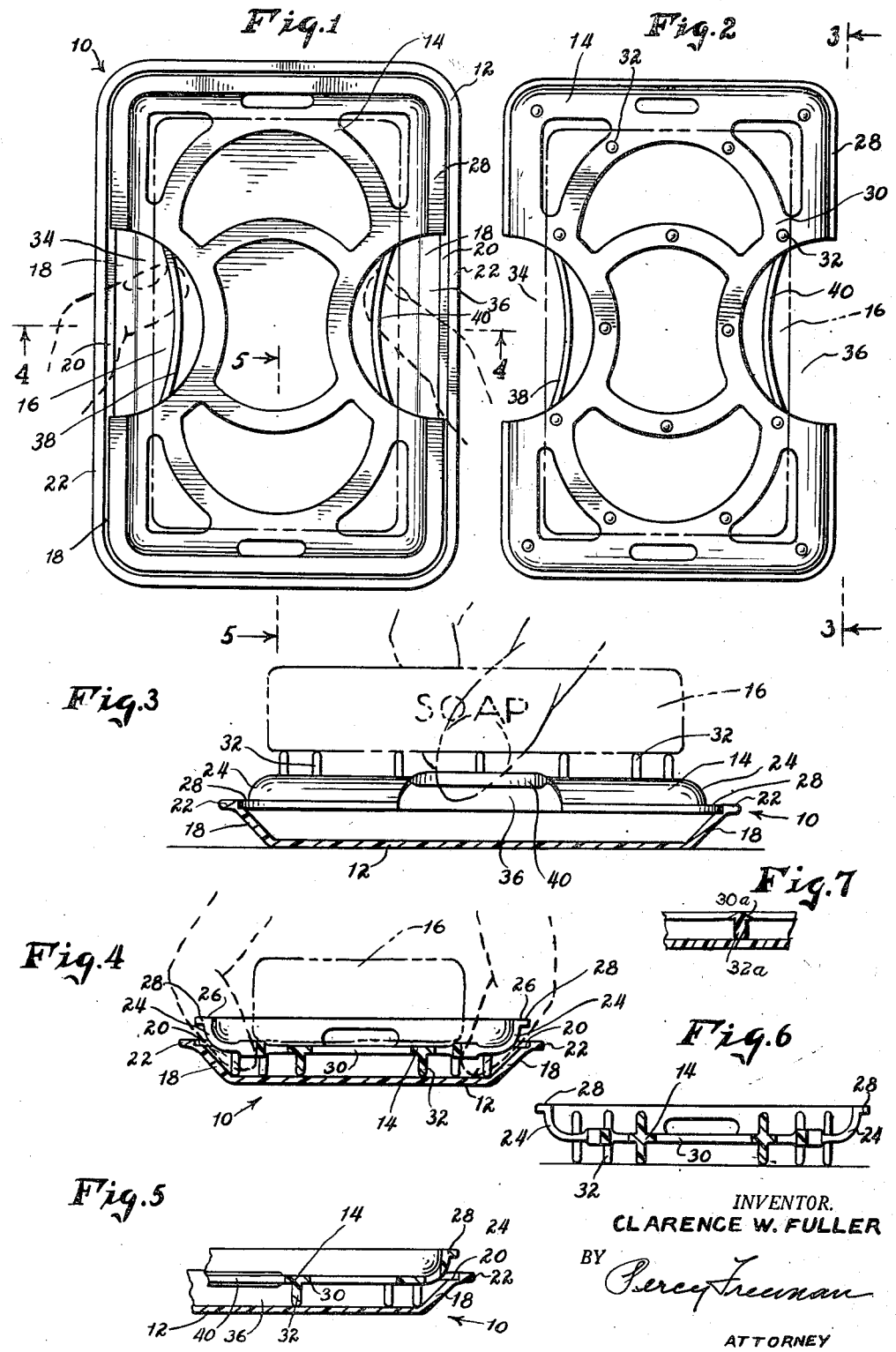

SOAP DISHES

Clarence W. Fuller, Cos Cob, Conn.

Application February 27, 1956, Serial No. 568,109

2 Claims. (Cl. 45—28)

This invention relates to soap dishes and more particularly, to a soap dish incorporating a grid.

Conventional holders and dishes for soap make little effective provision for the fact that a cake of soap is generally wet when placed in the dish. Consequently, the underside of a cake of soap which is in contact with the dish is more or less sealed off from the surrounding atmosphere, and thereby prevented from drying. As a result thereof, the underside of the soap cake becomes gelatinous, repugnant to the touch, and tends to adhere to the bottom of the dish.

Accordingly, one of the primary objects of the present invention is to provide a soap dish wherein a cake of soap may be thoroughly exposed to the drying action of the atmosphere.

It is another important object of the present invention to provide a soap dish having two means for effecting the rapid drying of a cake of soap, one for when the soap is in constant use, and the other for when the soap is stored for an indefinite period of time.

It is still another object of the present invention to provide a soap dish wherein a cake of soap may be readily dislodged and removed therefrom.

It is still a further object of the present invention to provide a soap dish which provides for the drainage of the soap.

It is yet another object of the present invention to provide a soap dish having carrying means for transporting a cake of soap without the necessity of touching the cake itself.

Briefly stated, the present invention comprises a soap dish for drying a wet cake of soap while same is held in the dish comprising a grid adapted to be supported above a surface and elevations projecting from said grid upon which a cake of soap may rest whereby the cake of soap is thoroughly exposed for drying when positioned as aforesaid.

A fuller understanding of the invention and the manner in which its objectives and advantages may be realized will become apparent from the following detailed description thereof taken in connection with the accompanying drawing wherein:

Fig. 1 is a top plan view of an embodiment of the soap dish of the present invention;

Fig. 2 is a bottom plan view of an embodiment of the grid of the present invention;

Fig. 3 is a side view of the grid taken on lines 3—3 of Fig. 2 in the direction of the arrows;

Fig. 4 is a sectional view of the soap dish taken on lines 4—4 of Fig. 1.

Fig. 5 is a sectional view of a portion of the soap dish taken on lines 5—5 of Fig. 1;

Fig. 6 is a sectional view of another embodiment of the soap dish of the present invention; and Fig. 7 is a fragmentary sectional view of a detail of the invention.

Referring now to the drawing, the soap dish generally designated by numeral 10 essentially consists of a tray 12 and a reversible grid 14. A cake of soap 16 is represented in the figures by a broken line because if the cake were represented pictorially, it would detract from the clarity of the drawing.

As may be seen in the drawing, especially Fig. 4 thereof, the tray 12 is provided with an outwardly inclined wall 18 which extends from a peripheral portion thereof and is thereby able to function much in the manner of a reservoir in the combination shown. At the terminal edge 20 of the said wall an outwardly extending lip 22 is provided for reasons hereinafter explained.

Likewise, the grid 14 is provided with an outwardly inclined wall 24 extending from a peripheral portion thereof. The terminal edge 26 of the said wall also carries a lip 28. Depending from the underside 30 of reversible grid 14 in the first position of the grid, are a number of legs or projections 32 which bear upon the floor of reservoir 12 and support the grid 14 a distance above said floor. In the first position of the reversible grid, cake of soap 16 rests directly upon the grid, as may be seen in Fig. 4.

It may be seen that the clearance between the wall of tray 12 and the wall of grid 14 is generally very slight. However, at the cut out portions 34 and 36 of the grid, the clearance between the respective walls is considerable. Members 38 and 40 supported by the said grid extends across spaces 34 and 36 respectively, for reasons hereinafter explained.

As will be seen in Fig. 3 of the drawing, the grid 14 may be reversed. When reversed, the elevations 32 extend away from tray 12. In this second position of the grid, the grid is supported upon a ledge formed by the terminal edge 20 of wall 18 and lip 22. Lip 28 of grid wall 24 fits upon the said ledge and firmly supports the grid which is thereby suspended across the tray. In the second position of the grid, cake of soap 16 rests upon elevations 32.

As is shown in the drawing, the soap dish of the present invention may be used with grid 14 either supported on legs 32 or supported on the ledge of the tray. In the latter position of the grid, almost the entire outer surface of the cake of soap will be exposed to the drying action of the atmosphere for the elevations 32 upon which the cake rests in this position are of inconsequential diameter. Although less of the surface of the soap is exposed to the atmosphere in the first position of the grid than in the second position of the grid, enough of the cake will be exposed in the first position to realize the objects of the present invention. It is advisable to use the grid in the second position when the soap is being repeatedly used so as to give the soap the best possible chance to dry before being used again.

It will be evident from the foregoing that by virtue of this invention the possibility of the soap gelatinizing and becoming repugnant to the touch is reduced to a minimum, and that the soap will have a prolonged life because with the formation of gelatinous masses on the surface thereof, a loss of soap must occur. Moreover, with the above construction, there is no possibility that the cake will adhere to the soap dish and be very difficult to dislodge therefrom.

As may be seen in the drawing, finger "access openings" 34 and 36 are provided in the grid and its wall permitting ready access to the underside of the grid for removal from the tray. Members 38 and 40 extending across the said openings provide a surface upon which the fingers may bear or which the fingers may grip so that the soap may be transported from a sink, for example, to a wall niche usually associated with bathtubs and stall showers. It is therefore possible by this invention to transport a cake of soap from place to place without actually touching the cake itself. If it is desired to transport the entire dish, the dish may be held by its lip 22 without any danger of slippage.

The drainage of soap presents no problem by virtue of the walled construction of both the grid and the tray and although in the second position of the grid the soap is elevated above both the wall of the tray and the wall of the grid, the construction is such that water and dissolved soap will necessarily be directed in the tray.

In Fig. 6 an embodiment of the invention is shown wherein the walled tray may be eliminated and elevations are provided on the upperside and underside of the grid. In this embodiment of the invention, as before, two positions of the grid may be utilized for the holding of soap simply by turning the grid over upon itself with or without the walled tray.

The bars of the grid may, if desired, be tapered, as shown in Fig. 7, so as to present upwardly the apex of the grid bars which may be shaped substantially triangularly.

Although the invention has been described in detail with respect to several preferred embodiments thereof, it will be understood by those skilled in the art, after reading this specification, that further changes and modifications may be made without departing from the spirit of the invention and the scope of the appended claims.

I claim:

1. A soap dish for drying a wet cake of soap while same is held in the dish comprising a flat base member, an outwardly inclined retaining wall extending from the periphery of said base member, the walled member forming a reservoir for soap in solution, a reversible grid adapted to closely fit into the said reservoir for supporting a cake of soap, opposed midportions of said grid being horizontally indented and spaced inwardly from oppositely disposed portions of the said retaining wall for digital access to the underside of the grid when same is nested in the reservoir, members supported by the said grid extending longitudinally across the aforementioned indentations and upon which fingers inserted into the spaces may bear, a plurality of elevations extending from the grid for maintaining said grid elevated above said base member in a first position of the reversible grid, the reversible grid being dimensioned to rest upon the retaining wall elevated above the base member in a second position of the grid, the aforementioned elevations for supporting a cake of soap in the second position of the grid.

2. A soap dish for drying a wet cake of soap while same is held in the dish comprising a flat base member, an outwardly inclined retaining wall extending from the periphery of said base member, the walled member forming a reservoir for soap in solution, a lip extending outwardly from the terminal edge of the said wall, the said lip and edge forming a ledge extending about the interior of the reservoir, a reversible grid adapted to be maintained above said base member for supporting a cake of soap, an outwardly inclined wall extending from the periphery of said grid, a lip extending outwardly from the terminal edge of the grid wall, opposed portions of said walled grid being spaced horizontally inwardly from oppositely disposed portions of the reservoir wall for digital access to the underside of the grid when the grid is nested in the reservoir, a plurality of elevations extending from the grid for maintaining same elevated above the base member in a first position of the reversible grid, the lip of the walled grid resting upon the ledge extending about the interior of the reservoir to support the grid above the base member in the second position of the reversible grid, the aforementioned elevations extending freely from the reservoir for supporting a cake of soap in the second position of the grid.

References Cited in the file of this patent

UNITED STATES PATENTS

| 539,698 | Milligan | May 21, 1895 |
| 1,946,884 | Rutherford | Feb. 13, 1934 |

FOREIGN PATENTS

| 648,035 | Great Britain | Dec. 28, 1950 |